United States Patent [19]

Ashley

[11] Patent Number: 5,070,441
[45] Date of Patent: Dec. 3, 1991

[54] DISTRIBUTION OF POWER FROM A SIX PHASE POWERLINE TO ONE- AND THREE-PHASE LOADS

[76] Inventor: James R. Ashley, 2523 Lake Ellen La., Tampa, Fla. 33618

[21] Appl. No.: 633,459

[22] Filed: Dec. 24, 1990

[51] Int. Cl.⁵ ............................................. H02M 5/06
[52] U.S. Cl. ................................... 363/154; 363/153; 323/361
[58] Field of Search ............... 323/361; 363/152, 153, 363/154

[56] References Cited

U.S. PATENT DOCUMENTS

| | | | |
|---|---|---|---|
| 1,567,032 | 12/1925 | Calverley et al. | 363/153 |
| 1,603,833 | 10/1926 | Boyajian | 363/154 |
| 1,719,892 | 7/1929 | Kubler | 363/154 |
| 2,632,878 | 3/1953 | Uhlmann | 363/154 |
| 2,790,131 | 4/1957 | Nyyssonen | 363/154 |
| 3,711,762 | 1/1973 | Eckenfelder et al. | 363/154 |
| 4,779,181 | 10/1988 | Traver et al. | 363/153 |

Primary Examiner—Jeffrey Sterrett

[57] ABSTRACT

Apparatus and method are provided for distributing electrical power from a six phase powerline to both single phase and three phase loads. The invention provides for improved power transmission efficiency, and offers compatibility between an installed base of single and three phase loads and a new six phase distribution wiring system that is configured to reduce fringing electric and magnetic fields.

13 Claims, 4 Drawing Sheets

DISTRIBUTION OF POWER FROM A SIX PHASE POWERLINE TO ONE- AND THREE- PHASE LOADS

BACKGROUND OF THE INVENTION

Electrical power is distributed from central generating plants to homes, offices, and factories as three-phase alternating current. Concerns for the environment have motivated engineering research to improve power generation efficiency. In addition, there have always been efforts directed at improving power system efficiencies by reducing line losses. Since the power lost in the phase conductors is given by the square of current times the resistance, it is obvious that either increasing conductor diameter or the number of conductors (known as using a conductor "bundle") will reduce the "I squared R" losses. However, making these changes by themselves for three phase powerline does not change the fringing magnetic field under and near the powerline. Thus, eddy current losses in nearby water pipes, losses from inductive coupling to fences, etc., will not be changed. Furthermore, increasing wire diameter or adding paralleled conductors on the same crossarms will significantly increase the fringing electric field.

In recent years there has been an increasing public concern about possible biological effects of the low frequency electric and especially magnetic fields associated with the distribution and use of electrical power. If an engineering change is made to improve efficiency which, as in the example discussed above, will carry the disadvantage of increasing fringing electric or magnetic fields, it will meet with strong political opposition. Efficiency improvements must be coupled with fringing field reduction.

In discussing public health issues related to power lines, it is necessary to consider two classes of power lines:

1) Urban distribution lines running from a substation to distribution transformers located near the point of use, and commonly operated at 10 to 50 kV.
2) Urban and rural transmission lines that supply power from generating stations to substations and that are commonly operated at voltages above 69 kV.

Although much of the most recent public outcry has been directed at the second category of power transmission lines listed above, the 10-50 kV distribution lines may be more significant because of the vastly greater number of people exposed. Distribution lines in the 10-50 kV category, if mounted on poles, can give rise to electrical fields of as much as 20 V/m, and magnetic fields as high as 1.3 micro-tesla when measured on the ground below the lines. Maintenance workers, such as tree trimmers who work near the 10-50 kV distribution powerlines, receive a significantly higher exposure to both electric and magnetic fields.

The issue of fringing fields from 10-50 kV lines has a well known solution that is not always economically feasible—underground utilities. Both theory and measurements show that placing all three phase conductors in a common conduit provides nearly perfect magnetic and electrostatic shielding. Underground utilities are also recommended by their improved reliability, appearance, and safety from accidental electrocution. These factors have led to their widespread use in new construction. A major question in the controversy over possible health risks from fringing fields is whether to rebuild existing distribution lines and to literally bury the supposed problem. A method of reducing or eliminating fringing fields while using existing pole-supported open wires could provide an economically attractive alternative method of resolving the political problem.

The relative magnitude and rate of fall-off of both the fringing electric and magnetic fields is directly proportional to conductor spacing and, for distances beyond about 10 times the conductor spacing, inversely proportional to distance squared. For example, one can consider the significant difference of the fringing magnetic field measured near two types of 120/240 service drops to residences. In installations made before about 1950, all three wires running from the utility pole to a house were supported on individual insulators. Conductor separation was of the order of 30 cm. As insulating material became more weather resistant, this construction was replaced by a cable consisting of a support wire and the two "hot" wires, which are wrapped around the support wire in a spiral fashion. In this newer design, conductor separation is reduced to about 3 cm. This reduction of conductor-conductor spacing reduces fringing fields measured on the ground under the service drop to about 1/10 of the value found for the old wiring technique and increases the rate of fall-off away from the service drop.

The prior art three-phase distribution powerlines often have banks of capacitors distributed along the circuit. The purpose of these capacitors is to draw a leading current to offset the lagging current of inductive loads, such as refrigeration motors. The leading current offsets the lagging current to bring the power factor closer to unity and minimize the total current in the distribution powerline, thus minimizing powerline I squared R loss.

The foregoing discussion is directed toward powerlines made of several parallel conductors. Another widely used transmission line design is "coaxial", which is widely used when electrostatic shielding is important. The adaptation of coaxial lines to the fringing field-free transmission of three-phase electric power has been discussed in my co-pending application (U.S. Ser. No. 07/578,215), which is incorporated herein by reference.

Coaxial transmission lines have a higher capacitance per unit length than do parallel lines, and will hence have a higher leading power factor. In a 10-50 kV distribution line this may be an advantage, as both fluorescent lights and induction motors operate with a lagging power factor that the coaxial line may offset. Consequently, the added capacitance of the coaxial transmission line reduces power loss by correcting lagging power factors.

It is instructive to consider the fringing magnetic fields associated with both the parallel wire and coaxial transmission lines. For the two parallel wire case one can show from electromagnetic theory that, for all locations that are further away from the transmission line than 10 times the inter-conductor spacing, the magnetic intensity is directly proportional to line spacing and inversely proportional to the square of distance. That is, near the conductors the electric and magnetic fields are intense, but once one moves away more than 10 times the conductor spacing, the fields become rapidly weaker. Magnetic intensity varies inversely with the square of distance. Thus, for prior art three phase power transmission lines, the general rule is that reduction of fringing fields accompanies close conductor spacing. This accounts for the negligible magnetic fields on the surface of the ground above buried distribution powerlines. Of course, other factors enter into the engineering choice of conductor spacing. Thus, reducing fringing fields by reducing conductor spacing has some very practical limitations such as arcing between phase lines.

For the case of the coaxial line, one finds complete electrostatic shielding of the inner conductor by an outer conductor, and transmission line theory shows that if the return current flows in the outer conductor, there is no magnetic field outside the transmission line. This holds even for the outer conductor material being copper or other non-ferromagnetic material. For three phase power lines, the use of a separate coaxial line for each phase would not eliminate fringing magnetic fields, because one would generally find that the return current flowing in the outer conductor was not equal in magnitude to the forward current. In a co-pending patent application, OVERHEAD THREE-PHASE POWER LINE ELIMINATING FRINGING ELECTRIC AND MAGNETIC FIELDS, Ser. No. 07/578,215, Sept. 6, 1990, the present inventor taught methods of insuring an equality between the forward and reverse currents in the two conductors. The teachings of Ser. No. 07/578,215 have a further significant disadvantage, in that the return current flowing in the outer conductor of the coaxial cable consumes power which would not normally be consumed in three-phase power transmission.

OBJECTS OF THE INVENTION

It is an object of the invention to provide method and apparatus for the overhead distribution of multi-phase alternating electric current that decreases electrical and magnetic fields at both the fundamental and at higher harmonic frequencies when these fields are measured one meter above the surface of the earth under and adjacent to the power line.

It is a further object of the invention to reduce or eliminate health risks attributed to fringing magnetic fields in a manner that is compatible with existing installed overhead distribution facilities and more economical than other known expedients, such as burying urban distribution cabling in conduits.

It is a further object of the invention to provide an electric distribution wiring method and apparatus that has resistive losses substantially less than those found in prior art distribution wiring operated at the same power level.

It is yet a further object of the invention to provide an electric distribution wiring method and apparatus that improves the efficiency of power distribution by reducing losses in neutral conductors.

It is yet a further object of the invention to improve power transmission efficiency by partial correction of power factor for inductive loads.

It is yet a further object of the invention to reduce eddy current losses in conducting bodies, such as pipelines, that may be buried near a powerline.

It is yet a further object of the invention to reduce the loss of power inductively coupled to structures, such as fences, that may be near a powerline.

It is another object of the invention to provide an electrical distribution wiring method and apparatus that is less vulnerable to being taken out of service by lightning strikes than is the case for prior art three-phase overhead distribution systems.

It is another object of the invention to provide improved power transmission and distribution wiring and methods that are compatible with the existing prior art three-phase electric power transmission and distribution systems.

It is a further object of the invention to allow rebuilding of one distribution circuit at a time while using existing poles, crossarms, and phase conductors.

It is another object of the invention to reduce the hazard of electrocution by accidental contact of metal ladders, kites, TV antennas, etc., with the high voltage overhead distribution powerline.

DESCRIPTION OF THE PREFERRED EMBODIMENTS

Co-pending U. S. patent application, Ser. No. 07/594,061 filed Oct. 9, 1990, by the present inventor, which is incorporated herein by reference, teaches arrangements of six-phase transmission line conductors to reduce fringing electric and magnetic fields under and near an overhead powerline comprised of parallel conductors. That application's teaching bears on high voltage transmission and distribution powerlines where the sources and the loads, typically substations, are three-phase transformer banks. The present invention extends these teachings to the electric power distribution system and teaches apparatus and methods for connecting single phase loads to the distribution system while keeping fringing fields low.

Figure 1:
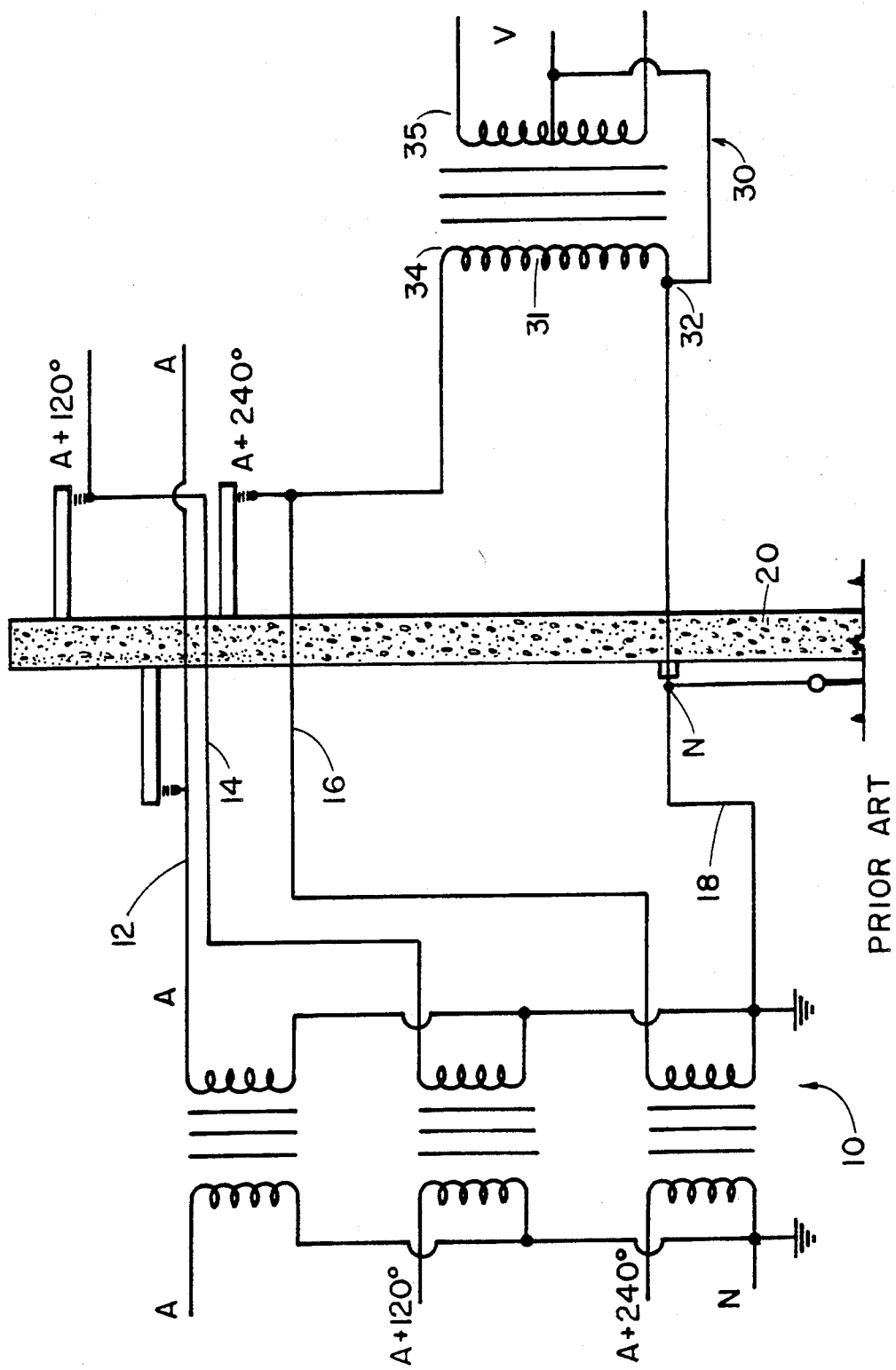
FIG. 1 is a schematic representation of a prior art 3 phase, wye connected, electrical power distribution arrangement that uses open wires supported on overhead poles.

Refer now to FIG. 1 which is a schematic representation of a prior art wye connected three-phase distribution system, comprising a substation 10, a set of conductors, including phase conductors 12,14,16 carrying currents with phases indicated as A, A+120° and A+240° and a neutral conductor 18 mounted on poles 20, and a typical single phase load transformer 30. At the point of use, particularly for residences, the single phase transformer 30 which has its primary windings 31 connected between one of the phase conductors 12,14,16 and the neutral conductor 18. This transformer has a center tapped secondary winding 35 to provide 120/240 V for lighting and appliances.

Figure 2:
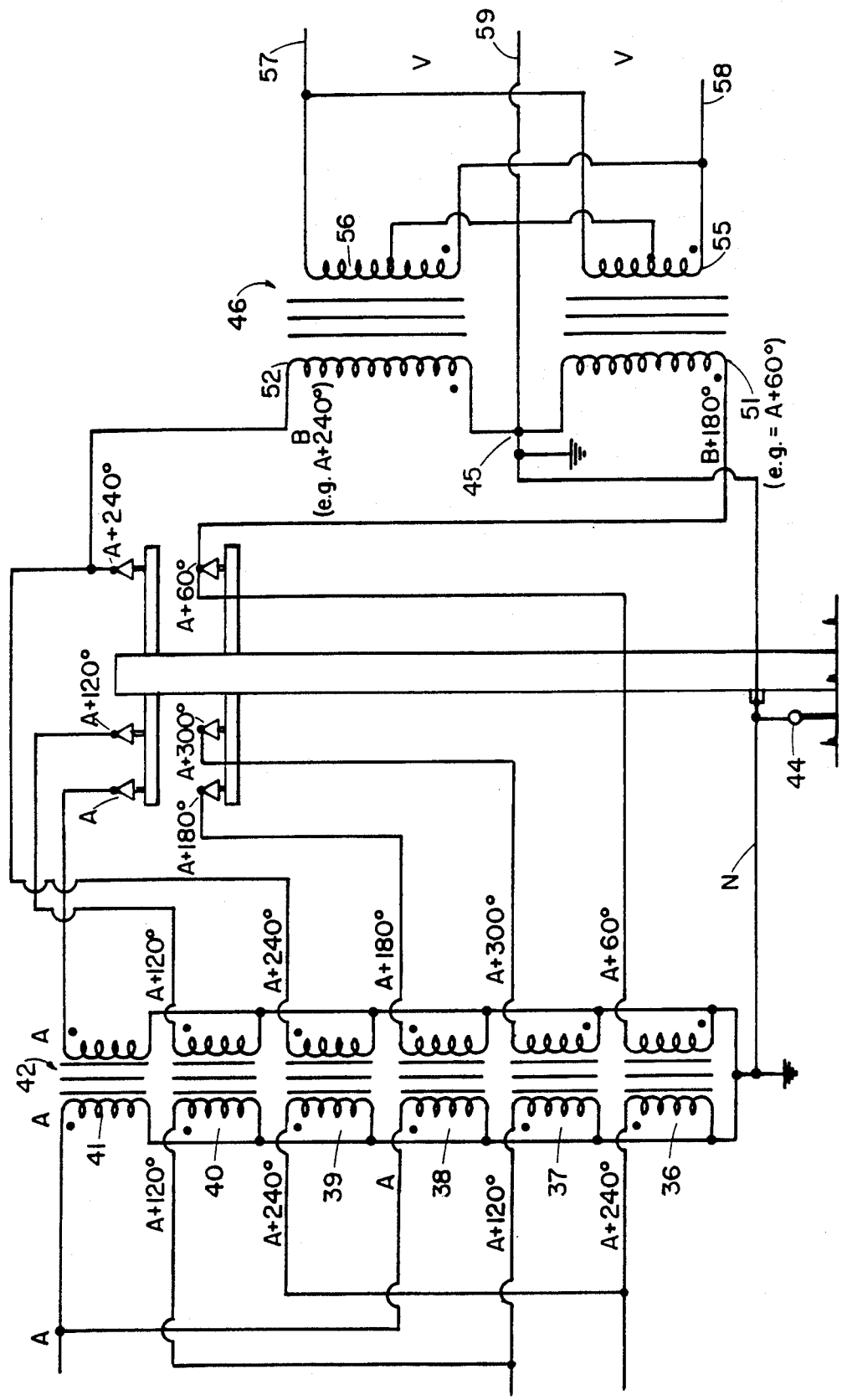
FIG. 2 is a schematic representation of a 6 phase open wire overhead distribution circuit that uses paralleled transformer secondaries at the point of use

A comparable and compatible six-phase distribution system in accordance with the present invention is shown in FIG. 2, wherein many sections of the wires have been omitted for the sake of clarity, and where the phasing of the various conductors is indicated by A, A+60°, A+120°, A+180°, A+240°, and A+300°. The connections for the source transformers 36–41 and the arrangement of the six-phase conductors shown in the figure, as taught in the aforementioned patent application, Ser. No. 07/594,061, significantly reduces both the fringing electric field and the fringing magnetic field below the powerline as well as in the region nearby where a residential building might be located. A neutral wire, generally indicated as N, is grounded at the source transformer array at 42, by ground rods 44 at some of the poles, and at the connection 45 to the load transformer pair 46. This neutral conductor, though not strictly necessary for the six-phase powerline, will subsequently be shown to be useful for protecting and improving the reliability of the powerline.

The single-phase load distribution transformer pair 46 have identical primary windings with connections 51, 52 to two phases of the six phase power line that differ by 180°. The phase connections 51, 52 are indicated, respectively, as B and B+180°, where B may be A, A+120° or A+240°. The identical secondary windings 55, 56 of the transformers 46 provide a single phase output, labeled V (commonly 120 Volts), between either of output conductors 57, 58 and the common center-tapped neutral connection 59.

Figure 3:
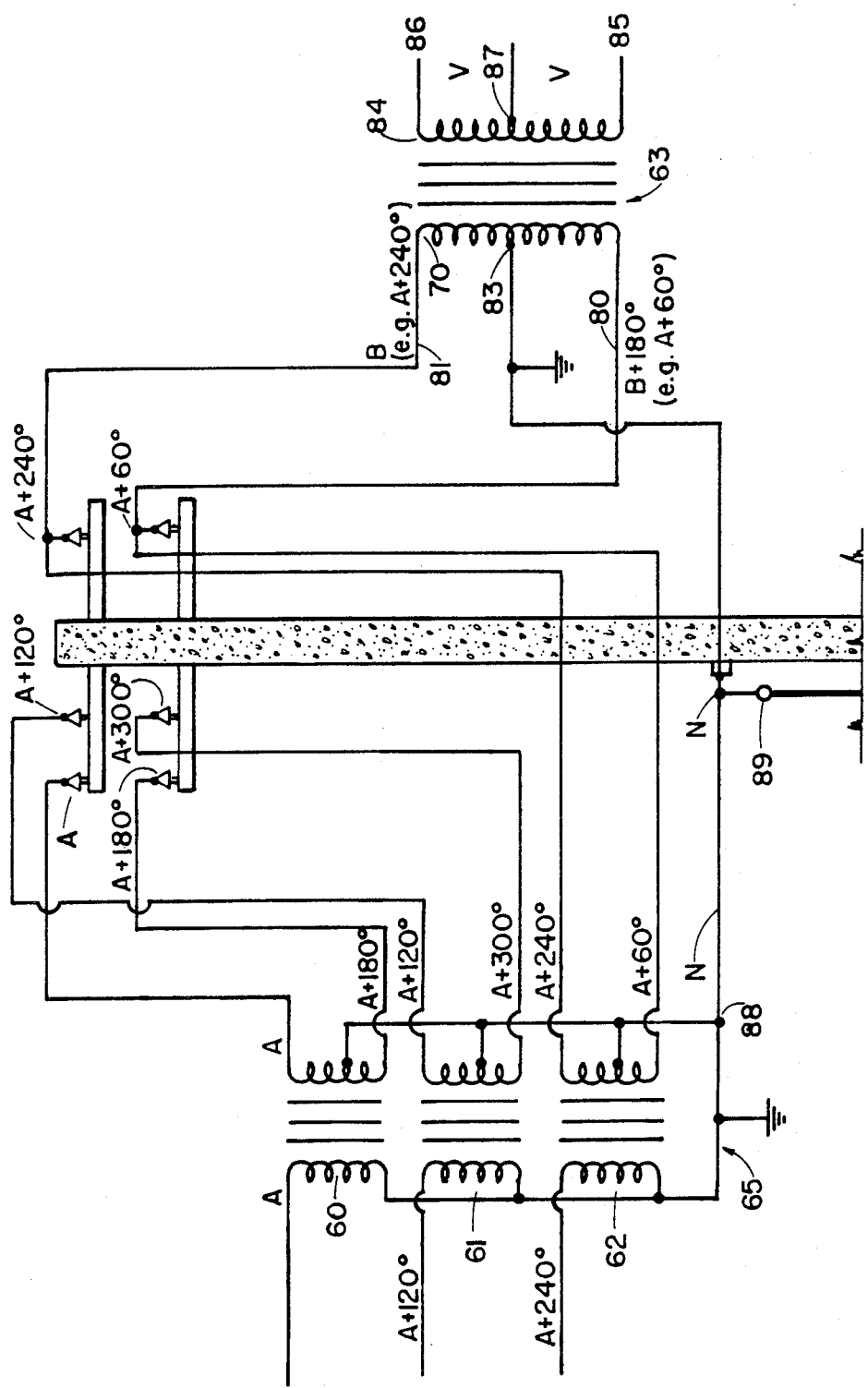
FIG. 3 is a schematic representation of a 6 phase open wire overhead distribution circuit that uses center-tapped transformers at the point of use.

Refer now to FIG. 3 wherein is shown another another embodiment of the present invention that uses center-tapped transformers 60, 61, 62, 63 both in the source substation 65 and for the load at point of use. The primary winding 70 of load transformer 63 of FIG. 3 is connected at 80 and 81 between two phases B and B+180° of the six-phase powerline, where B may be A, A+120° or A+240°. The winding 70 is center-tapped, and the centertap 83 is connected to the neutral conductor N of the powerline. The secondary winding 84 of the transformer 63 provides a single-phase output, labeled V (commonly 120 Volts), between either of output conductors 85, 86 and the common center-tapped neutral connection 87. FIG. 3 shows a neutral conductor, generally designated as N, that has a grounded connection 89 to the centertaps of the source transformers 65, a connection 83, which may be grounded, at the load transformer, and a number of intermediate grounds 89 at selected poles. As noted in the preceding discussion of FIG. 2, this neutral conductor is not strictly required for the operation of the six phase power line, but is useful for lightning protection and for improved power line reliability.

Even for replacing an existing three-phase distribution circuit with the disclosed six phase distribution circuit, replacement of the old transformers with the center-tapped transformers of FIG. 3 can be justified because the transformer cores would be the same weight and volume; thus, the mechanical size of the transformers will not be increased as much as would be required for the separate transformers of FIG. 2.

The embodiment of FIG. 3 preserves all of the advantages of the embodiment of FIG. 2. In particular, the absence of 60 Hz and 180 Hz current in the neutral conductor is a significant system advantage. It should be obvious to one skilled in the art of power distribution that the substations of FIGS. 2 and 3 can be interchanged; furthermore, a mixture of center-tapped and paralleled secondary single-phase transformers can be used to supply the single-phase loads fed by the substations of either FIG. 2 or FIG. 3.

The fringing magnetic field associated with the circuits of FIGS. 2 and 3 are also reduced below that of the circuit of FIG. 1 because the current in each phase conductor is reduced. That is, if a three-phase circuit is replaced by a six-phase circuit using the same conductor wire diameter and material and operated at the same phase to neutral voltage, then for the same total load power, the current in the six-phase conductors will be one-half the current in the three-phase conductors. Also, since power loss is $I^2R$, the loss per conductor in the six-phase circuit will be ¼ of that of the three-phase circuit. However, there will be twice as many conductors, so the total line loss will be half of that for the corresponding three-phase line.

The single-phase load transformers 50,63, shown in FIGS. 2 and 3, are always connected so that the bottom leads 51,80 of the primary winding are 180° out of phase with the top leads 52,81. Thus, the first of a series of loads would be connected between the 6 phase conductors A and A +180°, the next between A +120° and A 300°, and the next between A +240° and A +60°, etc. If the single-phase transformers are identical, then regardless of the balance or lack of balance of the load on the paralleled secondaries, the instantaneous current in the top primary winding is equal to the current in the bottom primary winding. Thus, there is no current in the six-phase neutral conductors 54,83 for any of the single-phase loads indicated schematically in FIG. 2 and 3.

Additionally, there is an advantage over prior art three-phase wye connection in that even if the loads on phases A—A +180°, B—B 180°, and C—C +180° are not balanced, there will still be no current in the neutral conductor. This means no power loss (I squared R loss) in the neutral. Furthermore, there will not be a third harmonic (180 Hz) magnetizing current from the load transformers flowing in the neutral. Thus, the 180 Hz component of fringing magnetic field will be significantly reduced.

Three-phase loads, such as a large capacity air conditioner or food refrigeration system, can be connected to the six-phase distribution system by recourse to transformers such as those indicated as 36-41 in FIG. 2 or as 60-62 in FIG. 3. The preceding discussion treated those transformers as being located in substations 40 or 65 where power from a three-phase source was coupled into a six-phase transmission system. It will be apparent to those skilled in the art that transformers having the same configurations, albeit with differing turns ratios, can be used to distribute power from a six-phase powerline to a three-phase load.

Another significant advantage of the arrangements of FIGS. 2 and 3 is that the neutral conductors, indicated generally as N, are available for prior art lightning protection. This protection is provided by grounding the neutral connections 42 and 88 at the source transformers, by providing grounds 44,89 at intermediate locations along the powerline, and by grounding the connections 45, 83 at the load transformers. Furthermore, if lightning or accident takes out one of the phase conductors, even the affected phase may continue to operate because the other half of the load transformers on the affected phase can draw the total power from the anti-WR-:G conductor of the pair. Reliability of the six-phase circuit is thus predicted to be better than for the three-phase circuit that it replaces.

Note that if it were not for lightning protection and other safety and redundancy considerations, the neutral conductors and their grounds, as shown in FIGS. 2 and 3 of the drawing, could be omitted, since no current is carried by the neutral conductor.

Figure 4:
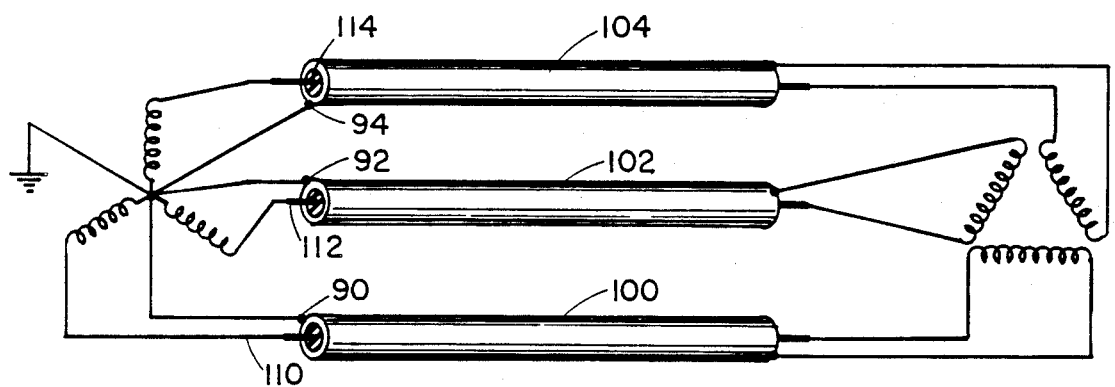
FIG. 4 is a schematic representation of a three phase power line configuration made of coaxial cables arraigned so as to minimize fringing fields.

Refer to FIG. 4 wherein a representation of a three-phase coaxial power transmission arrangement as taught in the aforementioned co-pending U.S. patent application Ser. No. 07/578,215 is shown. This arrangement provides control of fringing fields by ensuring that the return current flowing in each of the outer conductors 90, 92, 94 of the three coaxial cables 100, 102, 104 comprising a three-phase powerline is equal in magnitude to the primary current carried by the corresponding center conductors 110, 112, 114. As noted previously this design had a significant disadvantage, in that the return current flow in the outer conductor of the coaxial cable caused I squared R loss.

Figure 5:
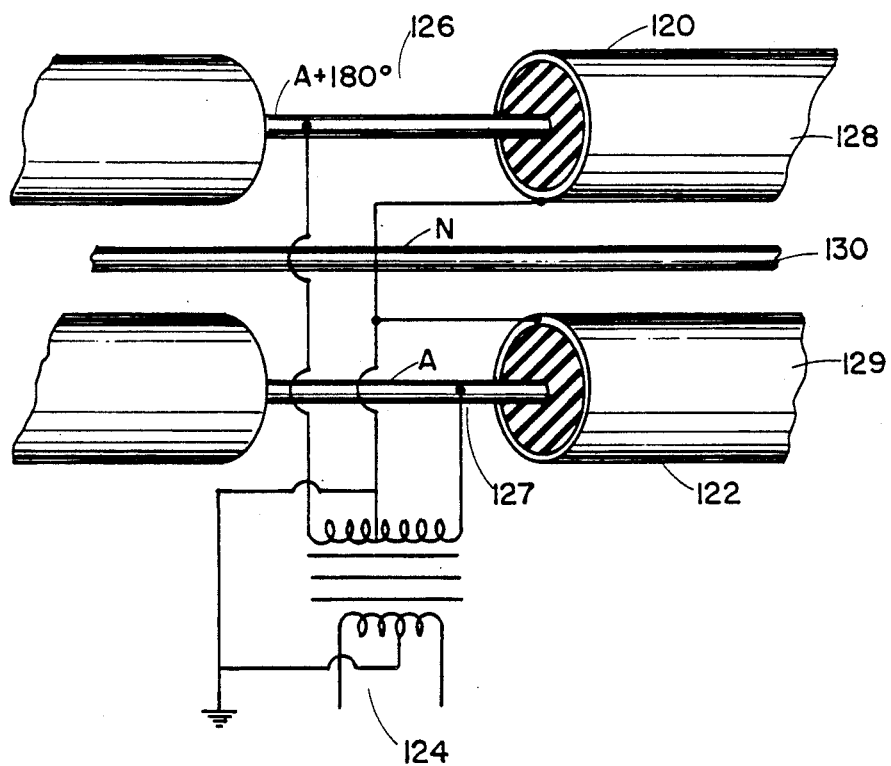
FIG. 5 illustrates the coupling of a single phase load to two coaxial conductors.

To overcome this disadvantage and to bring about other significant advantages, one may consider the arrangement, shown in FIG. 5, for grounding the coaxial shields (sheaths) 120, 122 and connecting a single-phase load 124 to the center conductors 126, 127 that form an antiphase pair of coaxial cables 128, 129 that are part of a six-phase distribution system. The other conductors in this system have been omitted from FIG. 5 for the sake of clarity. The connections from the center conductors 126, 128 of FIG. 5 to the single-phase load transformer 124 are substantially the same as those taught for the parallel wire distribution circuit that was previously presented in FIGS. 2 and 3. FIG. 5, moreover, illustrates a novel method of grounding the neutral conductor 130 and shield segments 120, 122 that avoids current flow in the sheath, and thereby avoids the power losses that occur in the teachings of the aforementioned Ser. No. 07/578,215 application. Essentially, only one end of each section of the sheath is grounded; therefore, no current can flow in the sheath. Additional insulating material, not shown in FIG. 5, can be used to prevent a difference in potential between the ungrounded ends of two adjacent sections of the sheath from causing a current flow.

In prior art taught by Kirke and Searing, Re. 17,235, Mar. 12, 1929, the matter of induced current in the coaxial outer conductor (sheath) is brought fourth. If a floating sheath surrounds a conductor carrying an alternating current, a potential difference proportional to the length of the sheath and to the time derivative of the current in the center conductor will be induced. If both ends of the sheath are connected to a good ground, current will flow in the sheath and cause a power loss. The method taught by Kirke, et. al. could be applied to the wiring arrangement shown in FIG. 5 in some cases. However, the symmetry of connection that is required by the Kirke, et. al. method would be difficult to arrange in outdoor overhead distribution powerlines.

Although the present invention has been described with respect to two principle embodiments and several minor variations thereof, many alterations and modifications may be made without departing from the invention. Accordingly, it is intended that all such alterations and modifications be considered as within the spirit and scope of the invention as defined in the appended claims.

I claim:

1. An apparatus for distributing electric power to an output circuit having two conductors and a neutral conductor from a six-phase powerline having six conductors respectively associated with six phases of the powerline and a neutral conductor comprising:
    a first transformer having a primary winding coupled between a conductor of said powerline associated with one phase of said six-phase and said neutral conductor of said powerline and a secondary winding coupled between said two conductors of said output circuit and having a center-tap coupled to said neutral conductor of said output circuit; and
    a second transformer having a primary winding coupled between said neutral conductor of said powerline and a conductor of said powerline associated with a phase that differs by 180° from said one phase and a secondary winding coupled between said two conductors of said output circuit and having a center-tap coupled to said neutral conductor of said output circuit.

2. The apparatus of claim 1 wherein said neutral conductor of said powerline is grounded.

3. The apparatus of claim 1 wherein said neutral conductor of said output circuit is grounded.

4. The apparatus of claim 1 wherein said neutral conductor of said powerline and said neutral conductor of said output circuit are tied to a common ground.

5. The apparatus of claim 1 wherein said six conductors are the center conductors of six coaxial cables.

6. An apparatus for distributing electric power to a single phase output circuit from a six-phase powerline having six conductors respectively associated with six phases of the powerline comprising a transformer with a center-tapped primary winding and a center-tapped secondary winding wherein
    said primary winding is coupled between a conductor of said powerline associated with one phase and a conductor of said powerline associated with a phase that differs in phase by 180° from said one phase, and
    a neutral conductor of said powerline is coupled to said center tap of said primary winding, and wherein
    secondary winding is coupled between two conductors of said output circuit, and said center tap of said secondary winding is coupled to a neutral conductor of said output circuit.

7. The apparatus of claim 6 wherein said neutral conductor of said powerline is grounded.

8. The apparatus of claim 6 wherein said neutral conductor of said output circuit is grounded.

9. The apparatus of claim 6 wherein said neutral conductor of said powerline and said neutral conductor of said output circuit are tied to a common ground.

10. The apparatus of claim 6 wherein said six-phase powerline is comprised of six coaxial cables and at least one neutral conductor that is not a conductor in one of said six coaxial cables.

11. Apparatus for connecting a powerline having six phases comprised of six conductors each respectively associated with one of said six phases to a three phase circuit, said apparatus comprising an array of transformers wherein each of said six conductors is connected to one end of a winding of one of said transformers.

12. The apparatus of claim 11 wherein said array comprises six transformers wherein each of said six conductors is connected to a different one of said six transformers and wherein a common neutral conductor is connected to that end of each of said windings of said six transformers that is not connected to one of said six conductors.

13. The apparatus of claim 11 wherein said array of transformers comprises three transformers each having a center tapped primary winding, said center tapped primary winding having two end connections and a center connection, and a center tapped secondary winding, said secondary winding having two end connections and a center connection wherein:

a first end of said primary winding of one of said transformers is connected to one of said six conductors of said six phase powerline, said conductor having a first associated phase, said second end of said primary winding is connected to that other one of said six conductors that has an associated phase that differs by 180° from said first associated phase; wherein a common neutral conductor of said six phase powerline is connected to said center tap of said primary winding of said one of said transformers, and wherein said two end connections and said center tap connection of said secondary winding of said transformer are connected to conductors of said three phase circuit.

* * * * *